US007748619B2

(12) United States Patent
Martin et al.

(10) Patent No.: US 7,748,619 B2
(45) Date of Patent: Jul. 6, 2010

(54) CARD DISPENSING APPARATUSES AND ASSOCIATED METHODS OF OPERATION

(75) Inventors: Douglas A. Martin, Woodinville, WA (US); Patrick E. Morford, Renton, WA (US); Gregory P. Winters, Snohomish, WA (US)

(73) Assignee: Coinstar, Inc., Bellevne, WA (US)

( * ) Notice: Subject to any disclaimer, the term of this patent is extended or adjusted under 35 U.S.C. 154(b) by 965 days.

(21) Appl. No.: 11/294,652

(22) Filed: Dec. 5, 2005

(65) Prior Publication Data

US 2007/0125845 A1 Jun. 7, 2007

(51) Int. Cl.
*G06K 5/00* (2006.01)
*B65G 59/00* (2006.01)

(52) U.S. Cl. ........................................ 235/381; 221/92

(58) Field of Classification Search ................ 235/381, 235/380; 221/123, 211, 217, 92
See application file for complete search history.

(56) References Cited

U.S. PATENT DOCUMENTS 3,757,917 A 9/1973 Waiwood et al.
4,252,250 A 2/1981 Toth
4,322,067 A * 3/1982 Masselin et al. .............. 271/99
4,687,119 A 8/1987 Juillet
4,825,054 A 4/1989 Rust et al.
5,106,260 A * 4/1992 Obrecht ................... 414/796.6
5,271,628 A 12/1993 Okada
5,350,906 A 9/1994 Brody et al.
5,365,046 A 11/1994 Haymann et al.
5,368,286 A * 11/1994 Horsman et al. .............. 271/11
5,457,305 A 10/1995 Akel et al.

(Continued)

FOREIGN PATENT DOCUMENTS

DE 3147603 6/1983

(Continued)

OTHER PUBLICATIONS

International Search Report, International Application No. PCT/US98/22534, dated Jan. 26, 1999.

(Continued)

*Primary Examiner*—Thien M. Le
*Assistant Examiner*—Sonji Johnson
(74) *Attorney, Agent, or Firm*—Perkins Coie LLP

(57) ABSTRACT

Apparatuses and methods for dispensing magnetic stripe cards, smart cards, other cards, and/or other items from kiosks and other structures are disclosed herein. In one embodiment, a card dispensing apparatus includes at least a first card hopper and a card transport assembly. The first card hopper is configured to hold a stack of cards that includes at least a first card stacked on a second card. The card transport assembly includes a card carrier moveable between a first position proximate to the first card hopper and a second position spaced apart from the first card hopper. The card carrier is configured to lift the first card off the second card when the card carrier is in the first position. The card carrier is further configured to release the first card toward an outlet when the card carrier is in the second position. In one embodiment, the card carrier can move the first card past a card reader/writer for reading information from, and/or writing information to, the card as it carries the card from the first position to the second position.

35 Claims, 10 Drawing Sheets

U.S. PATENT DOCUMENTS

| | | | | |
|---|---|---|---|---|
| 5,531,640 | A | | 7/1996 | Inoue et al. |
| 5,555,497 | A | | 9/1996 | Helbling |
| 5,564,546 | A | | 10/1996 | Molbak et al. |
| 5,577,959 | A | | 11/1996 | Takemoto et al. |
| 5,584,589 | A | | 12/1996 | Adkins et al. |
| 5,637,845 | A | | 6/1997 | Kolls |
| 5,665,952 | A | | 9/1997 | Ziarno |
| 5,699,328 | A | | 12/1997 | Ishizaki et al. |
| 5,743,429 | A | | 4/1998 | Morofsky |
| 5,746,299 | A | | 5/1998 | Molbak et al. |
| 5,799,767 | A | | 9/1998 | Molbak |
| 5,839,956 | A | | 11/1998 | Takemoto et al. |
| 5,949,046 | A | | 9/1999 | Kenneth et al. |
| 5,974,146 | A | | 10/1999 | Randle et al. |
| 6,102,248 | A | * | 8/2000 | Yamamiya .................. 221/211 |
| 6,105,009 | A | | 8/2000 | Cuervo |
| 6,116,402 | A | | 9/2000 | Beach et al. |
| 6,129,275 | A | | 10/2000 | Urquhart et al. |
| 6,138,106 | A | | 10/2000 | Walker et al. |
| 6,144,946 | A | | 11/2000 | Iwamura et al. |
| 6,185,545 | B1 | | 2/2001 | Resnick et al. |
| 6,230,928 | B1 | | 5/2001 | Hanna et al. |
| 6,233,564 | B1 | | 5/2001 | Schulze, Jr. |
| 6,253,955 | B1 | | 7/2001 | Bower |
| 6,289,324 | B1 | | 9/2001 | Kawan |
| 6,318,536 | B1 | | 11/2001 | Korman et al. |
| 6,405,182 | B1 | | 6/2002 | Cuervo |
| 6,415,262 | B1 | | 7/2002 | Walker et al. |
| 6,494,365 | B1 | | 12/2002 | Kozakai et al. |
| 6,494,776 | B1 | | 12/2002 | Molbak |
| 6,805,286 | B2 | | 10/2004 | Hilton et al. |
| 6,957,746 | B2 | | 10/2005 | Martin et al. |
| 7,044,330 | B2 | | 5/2006 | Chirnomas |
| 7,044,332 | B2 | | 5/2006 | Giegerich et al. |
| 7,128,261 | B1 | | 10/2006 | Henderson et al. |
| 7,156,300 | B1 | | 1/2007 | Dentlinger |
| 7,255,268 | B2 | | 8/2007 | Dentlinger |
| 2002/0026423 | A1 | | 2/2002 | Maritzen et al. |
| 2003/0094463 | A1 | | 5/2003 | Chirnomas |
| 2003/0155370 | A1 | * | 8/2003 | Martin et al. ............... 221/123 |
| 2004/0067789 | A1 | | 4/2004 | Grauzer et al. |

FOREIGN PATENT DOCUMENTS

| | | |
|---|---|---|
| EP | 0313294 | 4/1989 |
| EP | 0857579 | 8/1998 |
| EP | 1178448 | 2/2002 |
| GB | 2188467 | 9/1987 |
| JP | 1246698 | 10/1989 |
| JP | 3-63795 | 3/1991 |
| JP | 2000094871 | 4/2000 |
| WO | WO-99/50785 | 10/1999 |

OTHER PUBLICATIONS

International Search Report, International Application No. PCT/US03/04600, dated Jun. 23, 2003.

International Search Report, International Application No. PCT/US03/04799, dated Jul. 4, 2003.

International Search Report, International Application No. PCT/US03/04601, dated Aug. 19, 2003.

International Search Report, International Application No. PCT/US03/04603, dated Oct. 6, 2003, 4 pages.

International Search Report, International Application No. PCT/US03/11648, dated Nov. 10, 2003, 4 pages.

Sheehan, Michael, "Marriage of Convenience," 3 pages http://www.kioskbusiness.com/NovDec01/articles/article4.html [accessed May 16, 2003].

International Search Report, International Application No. PCT/US06/45275, dated Mar. 25, 2008, 3 pages.

Written Opinion, International Application No. PCT/US06/45275, dated Mar. 25, 2008, 7 pages.

Non-Final Office Action; U.S. Appl. No. 10/367,110; Mailed on May 11, 2004; 6 pgs.

Notice of Allowance; U.S. Appl. No. 10/367,110; Mailed on Oct. 28, 2004; 5 pgs.

Final Office Action for U.S. Appl. No. 10/995,032, Mail Date Apr. 28, 2009, 17 pages.

Examiner's Report for Canadian Application No. 2,630,247, Mail Date Jan. 5, 2010, 3 pages.

Tranax Technologies, Inc., "Card Dispenser," 2007, 1 page, <http://www.tranax.com/products/self-service_products/accessories/index.cfm?product=carddisp>, [internet accessed on Aug. 11, 2009].

Examiner's Report for Australian Application No. 2006323072, Mail Date Sep. 10, 2009, 2 pages.

* cited by examiner

CARD DISPENSING APPARATUSES AND ASSOCIATED METHODS OF OPERATION

TECHNICAL FIELD

The following disclosure relates generally to apparatuses and methods for dispensing wallet-sized cards and other items from kiosks and other structures.

BACKGROUND

There are various types of vending machines and kiosks for dispensing prepaid credit cards, debit cards, phone cards, and other types of cards to customers. Such machines typically include a user interface for selecting a card, a monetary input device (e.g., a credit card reader or bill acceptor) for receiving payment, and an outlet for dispensing the card to the customer. In use, the customer selects a desired card with the user interface and deposits the required funds via the bill acceptor or credit card reader. Once the machine has confirmed the funds, a card dispenser housed within the machine dispenses the desired card to the consumer via the card outlet.

FIG. 1 is an isometric view of a card dispenser 100 configured in accordance with the prior art. The card dispenser 100 includes a card hopper 102 containing a plurality of cards 101, a card conveyor 104, a card reader 106, and a card outlet 108. In a typical vending machine application, the card dispenser 100 is housed within the machine so that only the card outlet 108 is exposed. In operation, after a user has selected a card and deposited the required funds, the card conveyor 104 removes the bottom-most card 101 from the hopper 102 and moves the card forward past the card reader 106.

As the card moves past the card reader 106, the card reader 106 reads information off a magnetic stripe on the card. The magnetic stripe can include one or more "tracks" of information. The information can include a unique code for associating the card with a particular account. For example, if the card is a prepaid credit card, then the code can be associated with a specific credit card account. Similarly, if the card is a prepaid phone card, then the code can be associated with a specific long-distance account. After moving past the card reader 106, the card conveyor 104 pushes the card through the card outlet 108 to be picked up by the user.

One shortcoming of the prior art card dispenser 100 is that it can only dispense a single type of card. As a result, additional card dispensers are required if more than one type of card is to be dispensed from a particular vending machine. Adding additional card dispensers, however, increases the cost, size, and weight of the vending machine. In addition, multiple card dispensers can increase the risk of card theft through the additional card outlets.

Another shortcoming of the prior art card dispenser 100 is that the card conveyor 104 removes cards from the bottom of the stack. This action can require substantial force when the card hopper 102 is full, and can lead to jams and other malfunctions during card dispensing. A further shortcoming of this design is that it is often difficult for the card reader 106 to read multiple card tracks in a single pass because of card misalignment and other factors. This leads to rejection of cards that would otherwise be usable if properly read.

SUMMARY

Aspects of the present invention are directed to apparatuses and methods for dispensing prepaid credit cards, phone cards, gift cards, stored-value cards, and other similar items from kiosks and other structures. An apparatus for dispensing wallet-sized cards from a kiosk in accordance with one aspect of the invention includes at least a first hopper portion and a card transport assembly positioned relative to the first hopper portion. The first hopper portion can be configured to hold a first stack of cards including at least a first card positioned on a second card. The card transport assembly can be configured to lift the first card off the second card, move the first card away from the first hopper portion and release the first card toward a card outlet.

A method for dispensing at least first and second card types from an enclosure in accordance with another aspect of the invention includes placing a first plurality of cards at a first location within the enclosure, and placing a second plurality of cards at a second location within the enclosure. The first plurality of cards can include at least a first card of the first type positioned on a second card of the first type. Similarly, the second plurality of cards can include at least a third card of the second type positioned on a fourth card of the second type. In response to receiving a first request for a card of the first type, the method can further include lifting the first card off of the second card and transferring the first card toward a card outlet. In response to receiving a second request for a card of the second type, the method can additionally include lifting the third card off of the fourth card and transferring the third card toward the card outlet. In one embodiment, the method can further include moving the first card past a card reader after lifting the first card off the second card.

DETAILED DESCRIPTION

Figure 1:
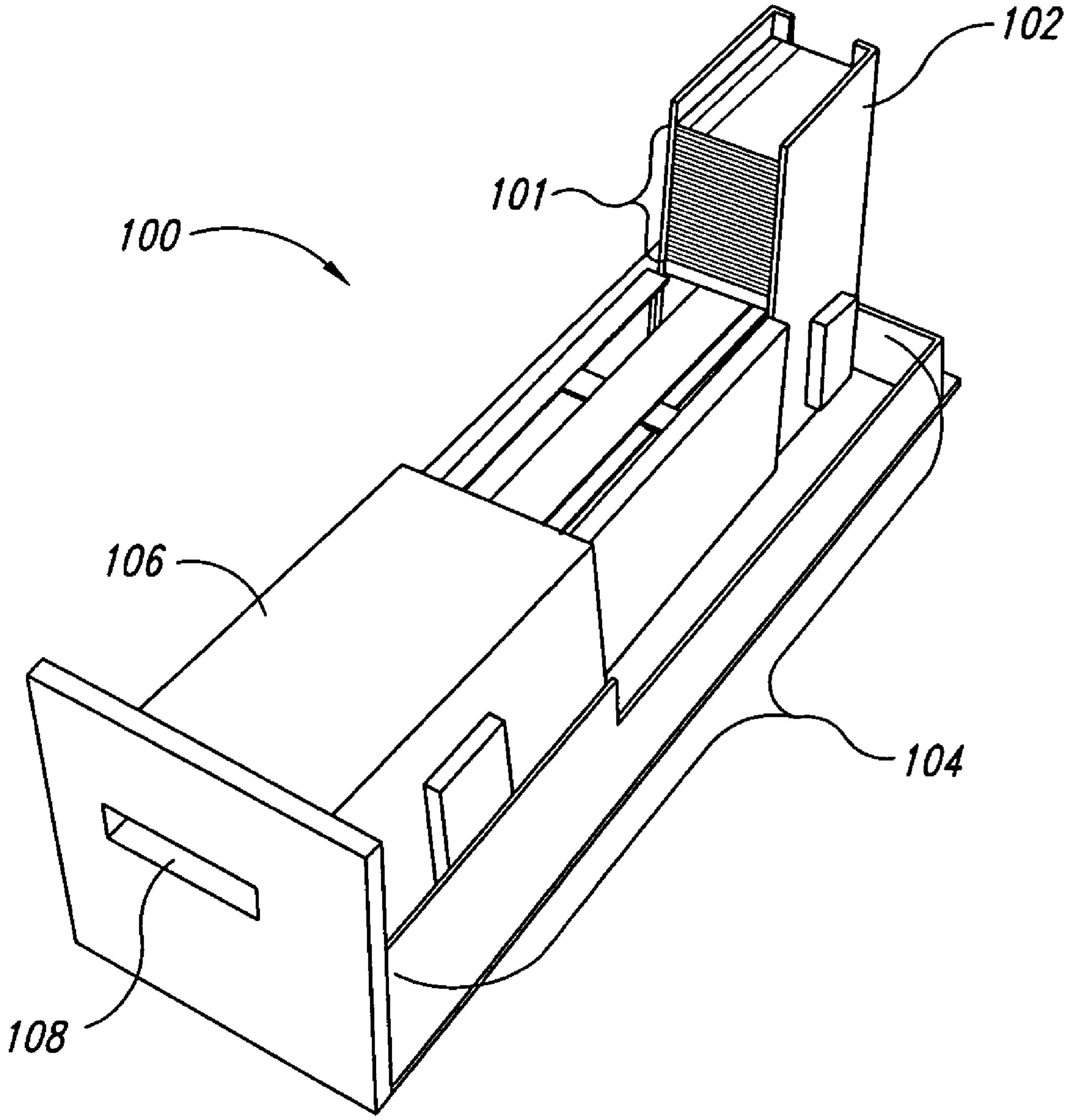
Fig. 1 (Prior Art)
FIG. 1 is an isometric view of a card dispenser configured in accordance with the prior art.

The following disclosure describes systems, apparatuses and methods for dispensing various types of cards (e.g., prepaid credit cards, debit cards, phone cards, etc.) and/or other items from vending machines, kiosks, and/or other structures. The systems, apparatuses and methods disclosed herein can include various features for reading information from, and for writing information to, various types of media. Such media can include, for example, magnetic media complying with one or more International Standards Organization (ISO) standards, memory chips embedded in integrated circuit (IC) cards, bar codes, radio frequency tags, optical media, etc. The systems, apparatuses and methods disclosed herein can also include various features described in U.S. patent application Ser. No. 10/367,110, filed Feb. 14, 2003 and entitled "APPARATUSES AND METHODS FOR DISPENSING MAGNETIC CARDS, INTEGRATED CIRCUIT CARDS, AND OTHER SIMILAR ITEMS," which is incorporated into the present application in its entirety by reference.

Certain embodiments of the apparatuses and methods described herein are described in the context of computer-executable instructions performed by a general-purpose computer. In one embodiment, these computer-executable instructions can be stored on a computer-readable medium, such as a floppy disk or CD-ROM. In other embodiments, these instructions can be stored on a server computer system and accessed via a communications link or a computer network, such as an intranet, the Internet, or other computer network. Because the basic structures and functions related to computer-readable routines and corresponding implementations are known, they have not been shown or described in detail here to avoid unnecessarily obscuring the described embodiments.

Certain specific details are set forth in the following description and in FIGS. 2-9 to provide a thorough understanding of various embodiments of the invention. Those of ordinary skill in the relevant art will understand, however, that the invention can have additional embodiments that may be practiced without several of the details described below. In addition, some well-known structures and systems often associated with card dispensing apparatuses and methods have not been shown or described in detail below to avoid unnecessarily obscuring the description of the various embodiments of the invention.

In the drawings, identical reference numbers identify identical or at least generally similar elements. To facilitate the discussion of any particular element, the most significant digit or digits in any reference number refers to the figure in which that element is first introduced. For example, element 210 is first introduced and discussed with reference to FIG. 2. Any dimensions, angles, and other specifications shown in the figures are merely illustrative of particular embodiments of the invention. Accordingly, other embodiments of the invention can have other dimensions, angles, and specifications without departing from the spirit or scope of the present disclosure.

Figure 2:
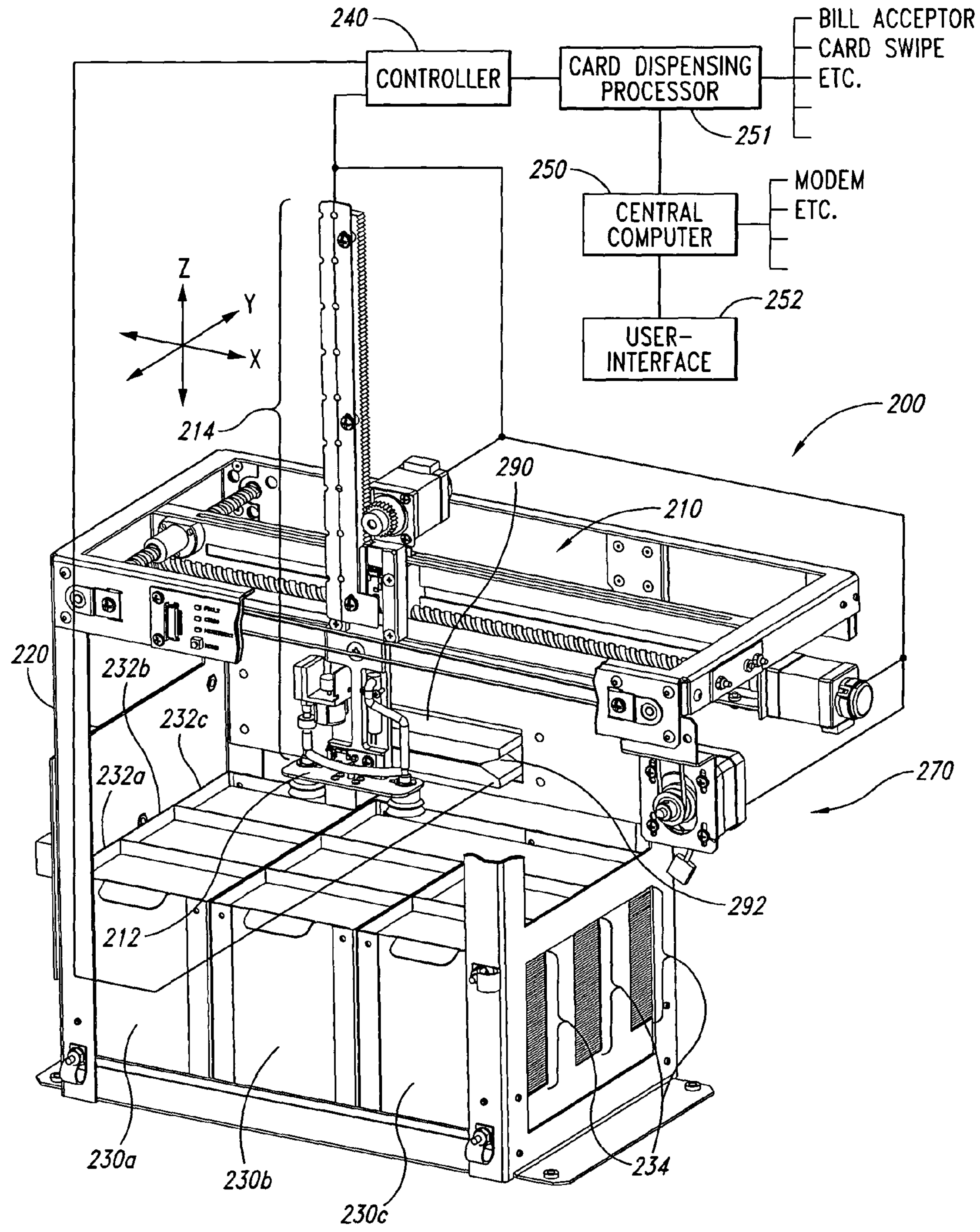
FIG. 2 is a partially schematic isometric view of a card dispensing apparatus configured in accordance with an embodiment of the invention.

FIG. 2 is a partially schematic isometric view of a card dispensing apparatus 200 configured in accordance with an embodiment of the invention. In one aspect of this embodiment, the card dispensing apparatus 200 includes a plurality of hopper trays 230 (identified individually as hopper trays 230*a*-*c*) positioned toward a bottom portion of a chassis 220. Each of the hopper trays 230 carries a plurality of individual card hoppers 232 (identified individually as card hoppers 232*a*-*c*). Each of the card hoppers 232 is configured to hold a stack (e.g., a vertical stack) of wallet-sized cards 234 (e.g., credit cards, debit cards, in-store cards, gift cards, on-line cards, phone cards, etc.). In the illustrated embodiment, each hopper tray 230 carries three separate card hoppers 232, giving the card dispensing apparatus 200 a total capacity of nine card hoppers. In other embodiments, however, other card dispensing apparatuses configured in accordance with the present invention can include more or fewer card hoppers.

In another aspect of this embodiment, the card dispensing apparatus 200 further includes a card transport assembly 210 carried by an upper portion of the chassis 220. The card transport assembly 210 includes a movable card carrier 214 having a selector head 212. As described in greater detail below, the card carrier 214 is configured to move back and forth along X and Y axes to position the selector head 212 over a desired card. Once in position, the card carrier 214 moves downwardly along a Z axis until the selector head 212 contacts the card. The selector head 212 then attaches itself to the card, and the card carrier 214 lifts the card out of the respective card hopper 232. The card carrier 214 then transfers the card to a release location 270 and drops it into a card outlet chute (not shown).

In a further aspect of this embodiment, the card dispensing apparatus 200 also includes a card reader 290 mounted toward a side portion of the chassis 220. As described in greater detail below, the card carrier 214 is configured to swipe individual cards through a slot 292 on the card reader 290 as it carries the cards toward the release location 270. In the illustrated embodiment, the card reader 290 includes a read head (not shown in detail) configured to read information off of the cards 234 (e.g., off of one or more tracks of a magnetic stripe, bar code, etc. on the card). In other embodiments, however, the card reader 290 can also include a write head configured to write information to the cards 234 (e.g., to a memory chip, magnetic stripe, etc. on the card) as the cards 234 pass through the slot 292. In one embodiment, the card reader 290 can be an ISO ANSI and AAMVA compatible Magstripe Swipe Card Reader (e.g., part number 21045034) from MagTek, Inc. of 20725 South Annalee Avenue, Carson, Calif. 90746. Such a device has bi-directional read capability and can read up to one million passes with ISO-conforming cards. In other embodiments, however, other types of suitable card readers known in the art can be used with the card dispensing apparatus 200. In a further embodiment, the card reader 290 can be omitted and the card dispensing apparatus 200 can be configured to dispense cards without reading them first.

In yet another aspect of this embodiment, the card transport assembly 210 and the card reader 290 are operatively connected to a controller 240 (shown schematically in FIG. 2). The controller 240 controls movement of the card carrier 214 in response to signals from a "data funnel" or processor 251 and/or the card reader 290. In addition, in those embodiments in which the card reader 290 includes writing capability, the controller 240 can transfer information from the processor 251 to the card reader 290 for writing onto a particular card.

The processor 251 transmits control signals to, and exchanges data with, the controller 240 in response to signals received from a central computer 250 and/or one or more payment devices (e.g., a bill acceptor, coin counter, credit or debit card reader, etc.). In the illustrated embodiment, the central computer 250 controls the overall functions of the particular vending machine, kiosk, or other structure in which the card dispensing apparatus 200 is housed. In this regard, the central computer 250 can receive user instructions, such as card selections and/or payment choices, via a user interface 252 (shown schematically in FIG. 2). As explained in greater detail below, the user interface 252 can include key pads, display screens, touch screens, selector buttons, and/or other suitable input devices known in the art. In this embodiment, the central computer 250 can also enable modem connections to remote computers in a computer network. Such connections can facilitate the exchange of data, such as card purchase and/or card account data, with one or more remote computers.

As those of ordinary skill in the art will appreciate, the present invention is not limited to the foregoing arrangement of processors and controllers. For example, in another embodiment, the card dispensing processor 251 can be omitted. In this embodiment, the central computer 250 can transmit control signals directly to, and exchange data directly with, the controller 240 for control of the card dispensing apparatus 200.

Figure 3:
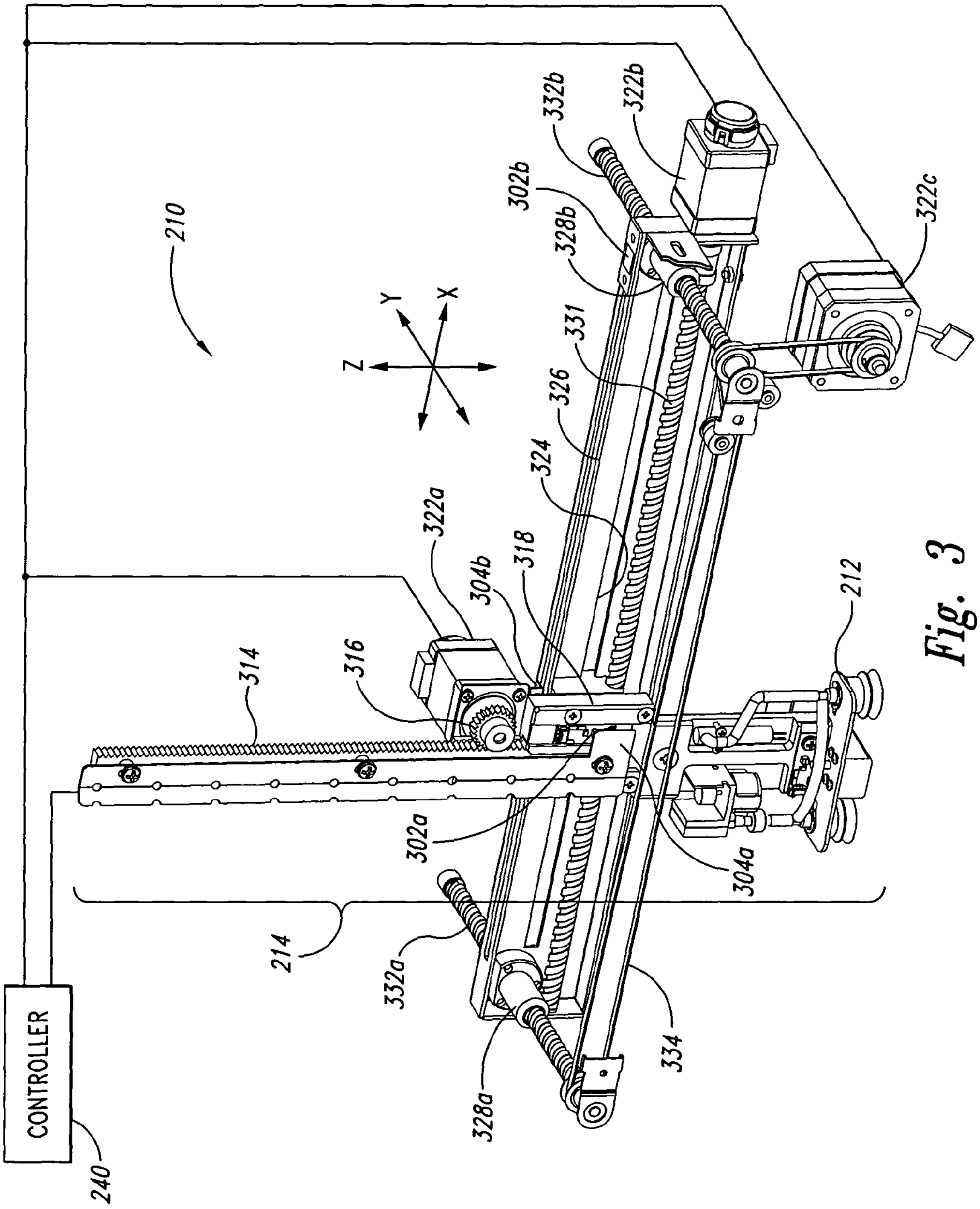
FIG. 3 is an enlarged, partially schematic isometric view of a card transport assembly of the card dispensing apparatus of FIG. 2, configured in accordance with an embodiment of the invention.

FIG. 3 is an enlarged, partially schematic isometric view of the card transport assembly 210 of FIG. 2. In one aspect of this embodiment, the card carrier 214 includes an elongate rack 314 that slides up and down along the Z axis in a guide block 318. A first motor 322*a* (e.g., an electric stepper motor) is fixedly attached to the guide block 318 and is operably connected to the controller 240. The first motor 322*a* drives a pinion gear 316 that engages a row of teeth on the rack 314. Rotation of the pinion gear 316 in a first direction in response to signals from the controller 240 drives the rack 314 downwardly along the Z axis. Conversely, rotation of the pinion gear 316 in the opposite direction drives the rack 314 upwardly along the Z axis.

The guide block 318 is slideably supported in a track 324 that extends along a support member 326 in the X direction. A first lead screw 331 threadably engages the guide block 318 and is operably coupled to a second motor 322*b*. The second motor 322*b* is operably connected to the controller 240. Rotation of the first lead screw 331 in a first direction in response to signals from the controller 240 moves the guide block 318 (and, accordingly, the card carrier 214) in a first direction along the X axis. Conversely, rotation of the first lead screw 331 in the opposite direction moves the guide block 318 in the opposite direction along the X axis.

A second lead screw 332*a* threadably engages a first lead nut 328*a* attached toward one end of the support member 326. Similarly, a third lead screw 332*b* threadably engages a second lead nut 328*b* attached toward the opposite end of the support member 326. A third motor 322*c* simultaneously drives both the second and third lead screws 332 by means of a timing belt 334. The third motor 322*c* is operably connected to the controller 240. Rotation of the lead screws 332 in a first direction in response to signals from the controller 240 moves the support member 326 (and, accordingly, the card carrier 214) in a first direction along the Y axis. Conversely, rotation of the lead screws 332 in the opposite direction moves the support member 326 in the opposite direction along the Y axis.

In another aspect of this embodiment, the card transport assembly 210 can further include a system of sensors that signal the controller 240 when the selector head 212 is in a "home" position. For example, in the illustrated embodiment, the card transport assembly 210 includes a first position sensor 302*a* fixedly attached to the guide block 318, and a corresponding first sensor flag 304*a* fixedly attached to the elongate rack 314. The first sensor 302*a* can include a reflective infrared device that detects the presence of the first sensor flag 304*a* when the selector head 212 is in the retracted position shown in FIG. 3. The card transport assembly 210 can further include a second position sensor 302*b* mounted to the support member 326, and a corresponding second sensor flag 304*b* attached to the guide block 318. The second sensor 302*b* can be similar in structure and function to the first sensor 302*a*, and can detect the presence of the second sensor flag 304*b* when the guide block 318 moves to the right in FIG. 3 to a "home" position on the support member 326. Although not shown in FIG. 3, a third sensor flag can be attached to the support member 326, and a corresponding third position sensor can be attached to the chassis 220 (FIG. 2) to detect when the support member 326 moves to a similar "home" position on the lead screws 332.

In other embodiments, other methods can be used to track the location of the selector head 212 relative to the chassis 220. For example, in one embodiment, the controller 240 can monitor rotations or "steps" of the individual motors 322*a*, 322*b*, and 322*c* and use these to determine the location of the selector head 212. In yet other embodiments, contact sensors or limit switches, as opposed to infrared sensors, can be used to track selector head position. In still further embodiments, various combinations of the foregoing apparatuses and methods can be used for this purpose.

Figure 4:
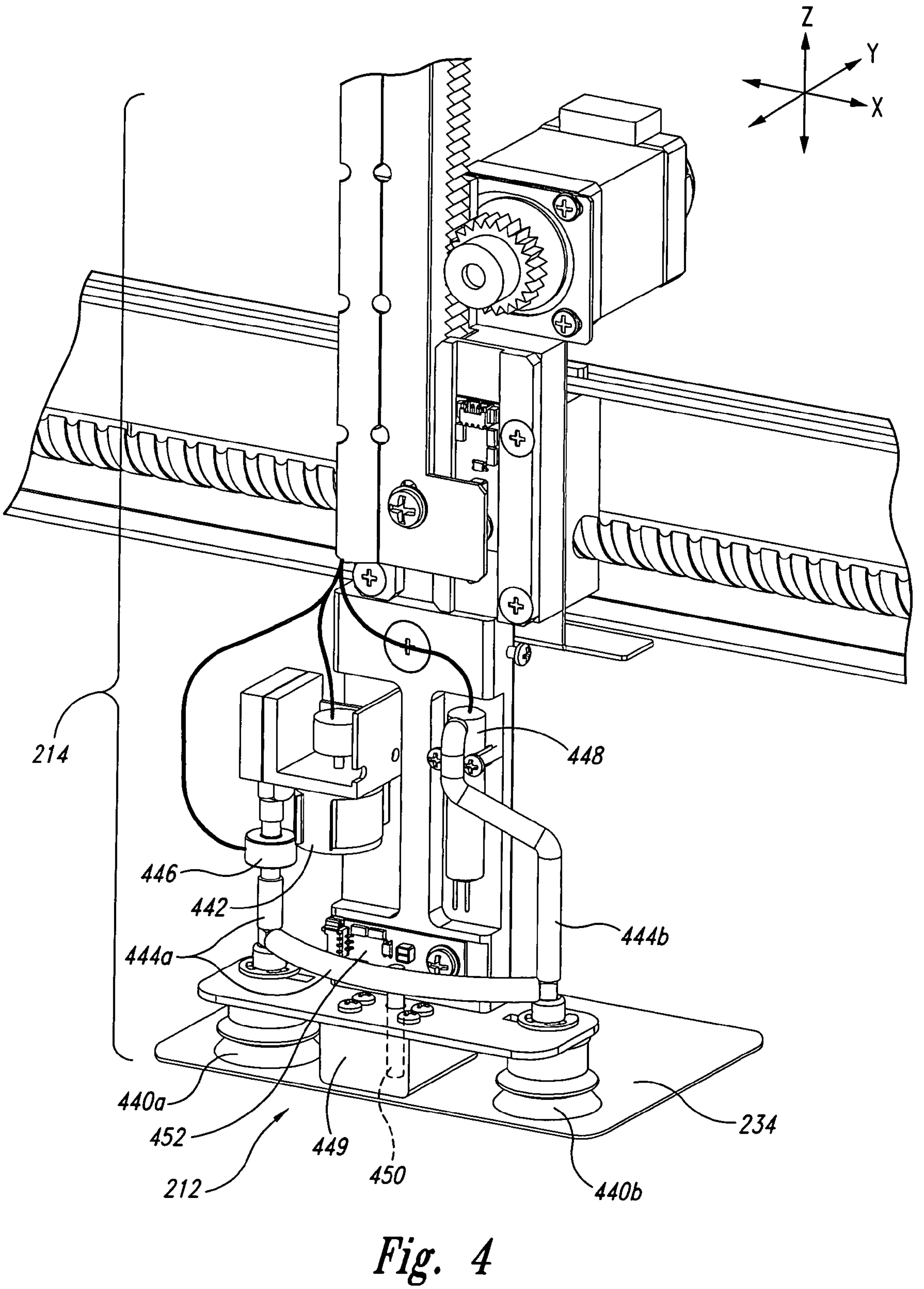
FIG. 4 is an enlarged isometric view of a card carrier of the card transport assembly of FIG. 3, configured in accordance with an embodiment of the invention.

FIG. 4 is an enlarged isometric view of a portion of the card carrier 214 described above with reference to FIGS. 2 and 3. In one aspect of this embodiment, the selector head 212 includes a first suction cup 440*a* and a second suction cup 440*b* connected to a pump 442 by a vacuum line 444*a*. Activation of the pump 442 by the controller 240 (FIG. 2) creates a vacuum in the suction cups 440 that causes the card 234 to stick to the cups. A one-way check valve 446 is spliced into the vacuum line 444*a* to maintain the vacuum in the event the power is lost or the pump 442 is inadvertently turned off. In the illustrated embodiment, the pump 442 can be a Thomas model 2002 micro-pump from Thomas Scientific, P.O. Box 99, Swedesboro, N.J. 08085. This pump is capable of achieving a maximum intermittent vacuum level of about 10.4 Hg (about 5.12 PSIG). In other embodiments, other pumps can be used to evacuate the suction cups 440.

In another aspect of this embodiment, the suction cups 440 are also connected to a release valve 448 by a vent line 444*b*. The release valve 448 works in conjunction with the check valve 446 to maintain vacuum in the suction cups 440 during card transport. When the card 234 arrives at the release location 270 (FIG. 2), the controller 240 turns the pump 442 off and opens the release valve 448 to release the vacuum in the suction cups 440 and drop the card 234. In the illustrated embodiment, the release valve 448 can be a simple solenoid valve, such as a Lee solenoid valve from the Lee Company of 2 Pettipaug Rd, P.O. Box 424, Westbrook, Conn. 06498. In other embodiments, other types of valves can be used to release the vacuum in the suction cups 440 and drop the card 234.

In most instances, the suction cups 440 only pick up one card when they are evacuated. Occasionally, however, two or more cards are stuck together in a stack. When this occurs, the suction cups 440 may inadvertently pick up both cards. One way to overcome this problem in accordance with the present invention it to cycle the release valve 448 at a very high frequency after picking up a card. Cycling the release valve 448 in this manner while the pump 442 is on causes the vacuum pressure in the suction cup 440 to vary, which in turn causes the card to flex. This flexing tends to break any adhesion that may exist between the top card and any under card, causing the under card to drop back onto the card stack.

Another method for solving this problem in accordance with the present invention is to arrange the suction cups 440 on opposite sides of a raised portion 449 (e.g., a raised ridge, bump, etc.). As the suction cups 440 are evacuated, they draw the selected card inwardly, bending the card over the raised portion 449. This bend tends to break any adhesion that may exist between the top card and any under card, causing the under card to fall back into the card stack.

In another aspect of the embodiment, the selector head 212 further includes a depth probe 450 for controlling the position of the suction cups 440 relative to the card 234. When the selector head 212 is not holding the card 234, the depth probe 450 extends down below the suction cups 440. As the suction cups 440 move downwardly toward the card 234, the depth probe 450 contacts the card 234 and begins sliding upwardly along the Z axis. The depth probe 450 is operably coupled to a switch 452, which in turn is connected to the controller 240

(FIG. 2). When the position of the depth probe 450 indicates that the suction cups 440 are in the desired position relative to the card 234 (e.g., sufficiently sealed against the card), the switch 452 sends a signal to the controller 240 that causes the card carrier 214 to stop moving downward toward the card 234. At this time, the controller 240 activates the pump 442 to evacuate the suction cups 440. The resulting suction holds the card 234 against the suction cups 440 so that the card carrier 214 can lift the card from the corresponding hopper 232 (FIG. 2). If the card 234 inadvertently falls off the suction cups 440 at any time, the depth probe 450 drops, causing the switch 452 to send a corresponding signal to the controller 240. The controller 240 can then respond by sending the card carrier 214 back toward the appropriate card hopper 232 to retrieve a new card.

Returning to FIG. 2, the card dispensing apparatus 210 can be used in one embodiment as follows. First, the user selects a desired card with the user-interface 252. The user-interface 252 transmits this request to the central computer 250, which in turn sends a corresponding instruction to the processor 251. After the processor 251 has confirmed payment for the card via the bill acceptor, card swipe, etc., the processor 251 instructs the controller 240 to dispense the selected card. The controller 240 then positions the card carrier 214 over the appropriate card hopper 232 by using the stepper motors 322*a-c* as described above with reference to FIG. 3. Once the card carrier 214 is in the proper position, the first stepper motor 322*a* drives the card carrier 214 downwardly toward the top card on the stack.

Referring now to FIGS. 2-4 together, as the selector head 212 moves downwardly along the Z axis toward the desired card (e.g., the card 234), the depth probe 450 contacts the card and begins moving upwardly relative to the switch 452. When the position of the depth probe 450 indicates that the suction cups 440 are sufficiently contacting the card 234, the switch 452 sends a signal to the controller 240 halting further downward motion of the card carrier 214. Next, the vacuum pump 442 at least partially evacuates the suction cups 440 to draw the card 234 against the cups. The check valve 446 ensures that (at least partial) vacuum is maintained in the suction cups 440 if power is lost or the pump 442 is inadvertently turned off. The first stepper motor 322*a* then drives the rack 314 upwardly along the Z axis to lift the card 234 out of the respective hopper 232. The second motor 322*b* then drives the first lead screw 331, and the third stepper motor 322*c* then drives the second and third lead screws 332, as required to position the card 234 in front of the card reader 290.

Figure 5:
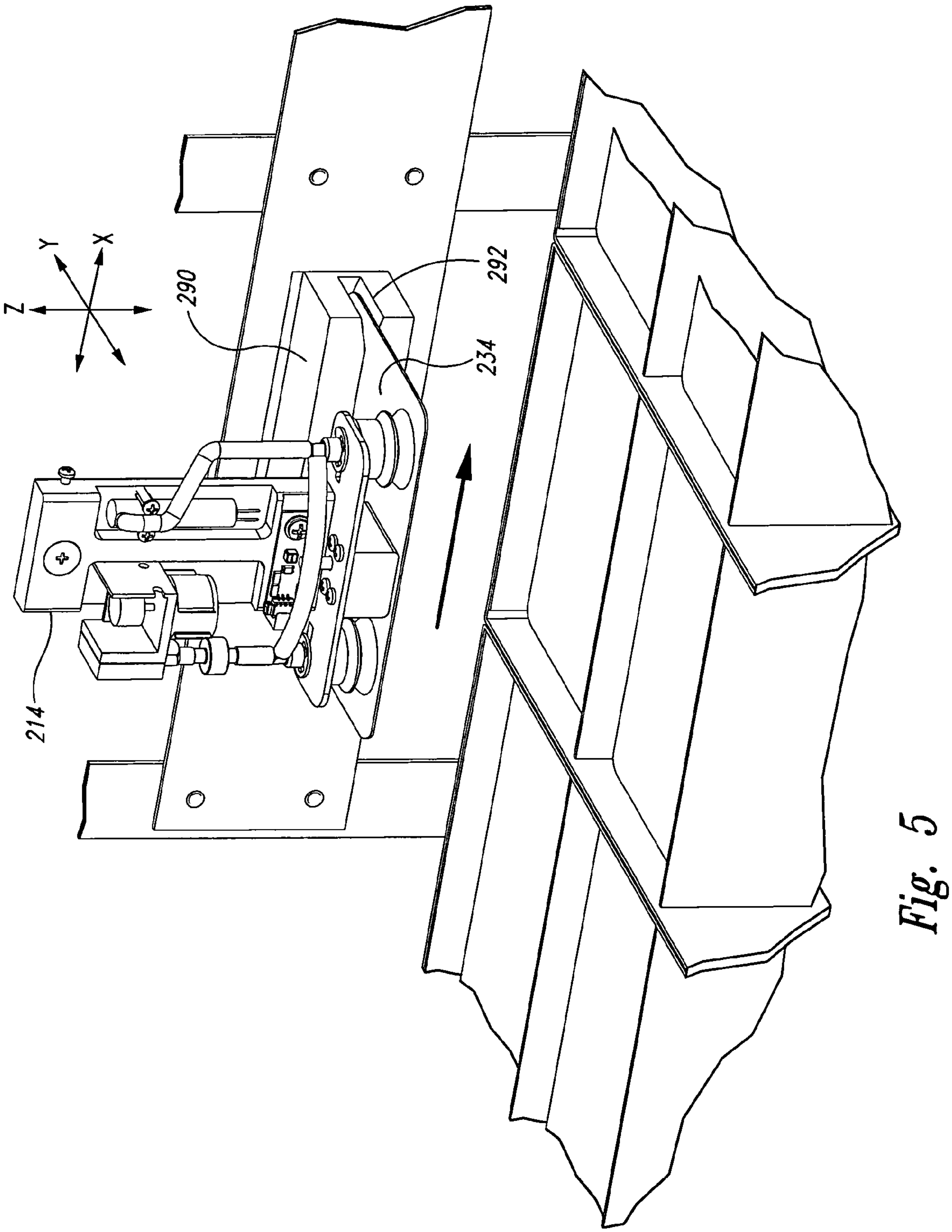
FIG. 5 is an enlarged isometric view of a card being swiped through a card reader by the card carrier of FIG. 4, in accordance with an embodiment of the invention.

FIG. 5 is an enlarged isometric view of the card carrier 214 swiping the card 234 through the card reader 290. As this view illustrates, the card carrier 214 moves the card 234 through the slot 292 in the X direction so that the card reader 290 can read card-specific data (e.g., an associated account number) off a magnetic stripe or other media on the card. If the card 234 is sufficiently read after the first pass through the card reader 290, then the card carrier 214 proceeds to the release location 270 (FIG. 2). If the card 234 is not sufficiently read, then the controller 240 signals the card transport assembly 210 to swipe the card through the card reader 290 a second time. The card 234 can be repeatedly swiped until it is either sufficiently read or a preset limit of swipes (e.g., three swipes) is reached. If the limit is reached and the card 234 still has not been sufficiently read, then the card can be discarded into a reject bin (described below). This situation could occur if, for example, the card is defective or it was inadvertently loaded into the hopper upside down or backward.

Figure 6A:
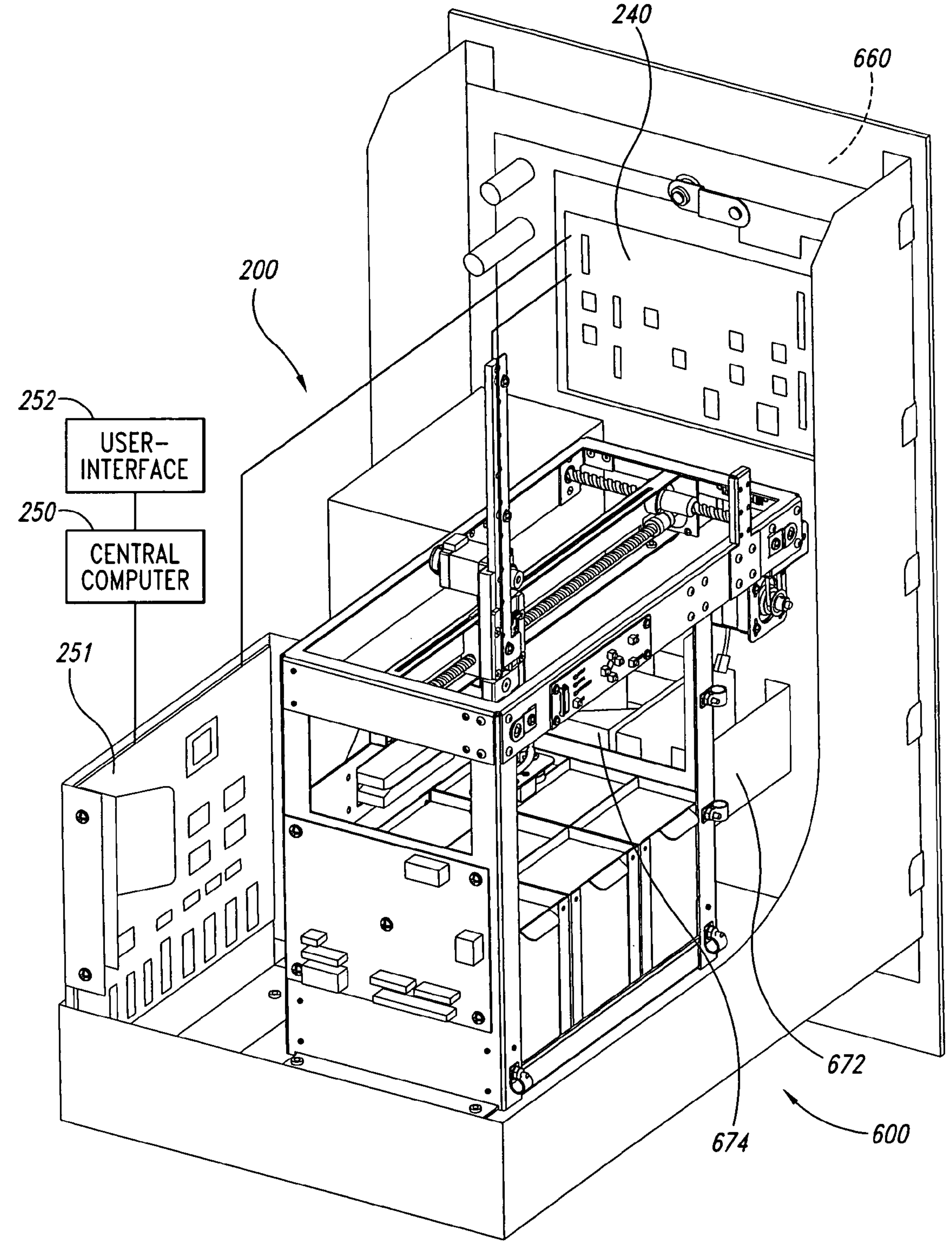
FIGS. 6A and 6B are rear and front isometric views, respectively, of a card vending drawer assembly configured in accordance with an embodiment of the invention.
Figure 6B:
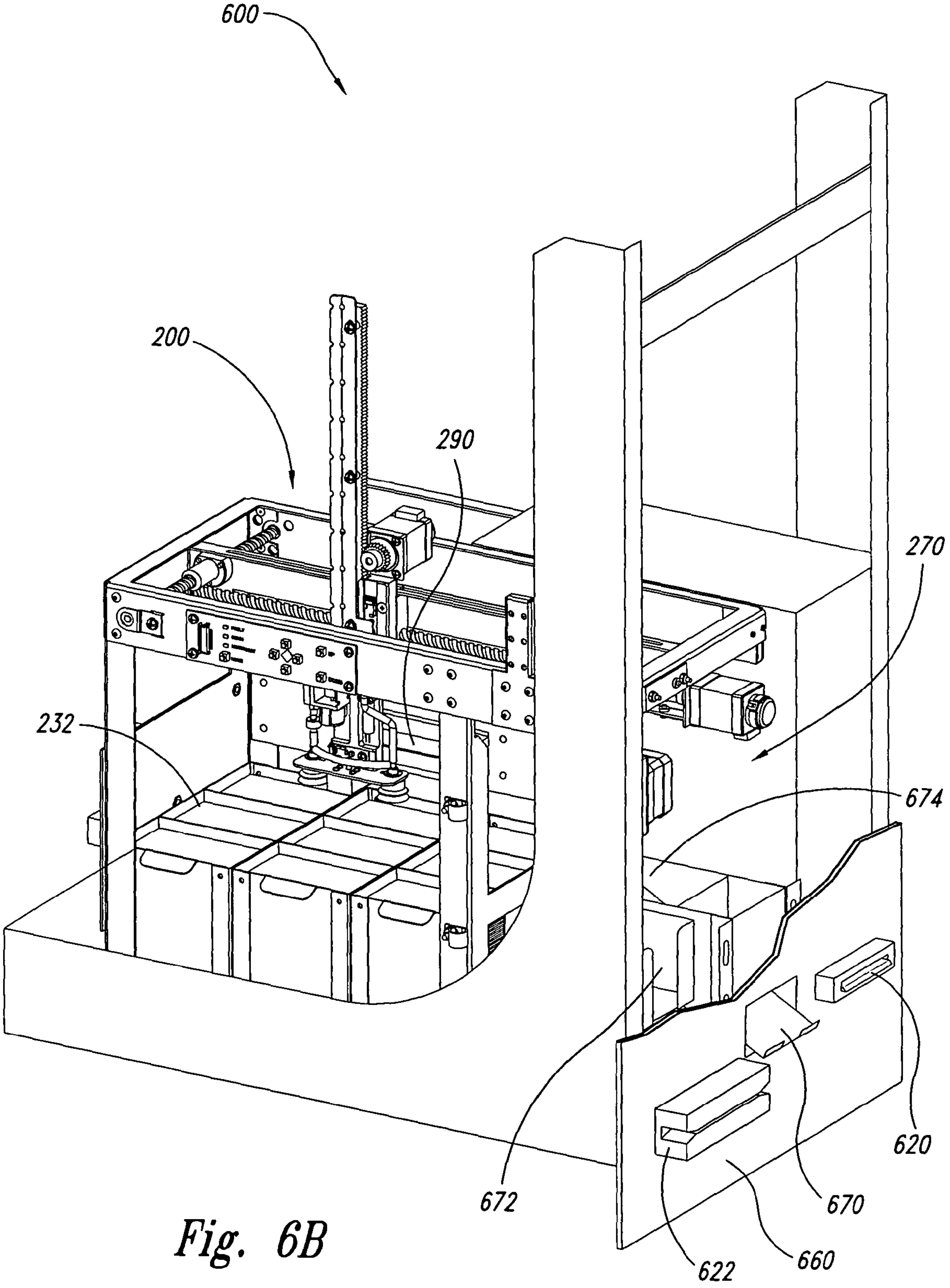

FIGS. 6A and 6B are rear and front isometric views, respectively, of the card dispensing apparatus 200 of FIG. 2 mounted to a drawer assembly 600 in accordance with an embodiment of the invention. As shown in FIG. 6A, the controller 240 is mounted to a backside of a front panel 660 of the drawer assembly 600, and the card dispensing processor 251 is mounted toward a rear portion of the drawer assembly 600. Referring to FIG. 6B, the front panel 660 can support a number of different devices for receiving funds and/or other forms of payment from a user. For example, the front panel 660 can include a card reader 622 and a bill acceptor 620. The card reader 622 can be configured to read a conventional credit card, debit card, ATM card, or the like when swiped through the card reader 622 by the user. The bill acceptor 620 can be configured to receive paper money from the user.

In one aspect of this embodiment, the drawer assembly 600 further includes a card chute 674 that leads to a card outlet 670. In operation, the card dispensing apparatus 200 retrieves a desired card 234 from one of the card hoppers 232, swipes the card through the card reader 290, moves the card to the release location 270, and drops the card into the chute 674 for transfer to the outlet 670.

As explained above, the card dispensing apparatus 200 has the capability of swiping a card through the card reader 290 multiple times if required to sufficiently read information off the card (and/or write information to the card). If, however, the card reader 290 is unable to sufficiently read a card (because, for example, the card was placed into the hopper 232 upside down) after a preset number swipes (e.g., three), then the card dispensing apparatus 200 releases the unread card into a reject bin 672 and retrieves a new card from the appropriate hopper. This feature prevents the card dispensing apparatus 200 from dispensing unusable cards to customers, and allows any upside down/backward cards to be reused.

Figure 7:
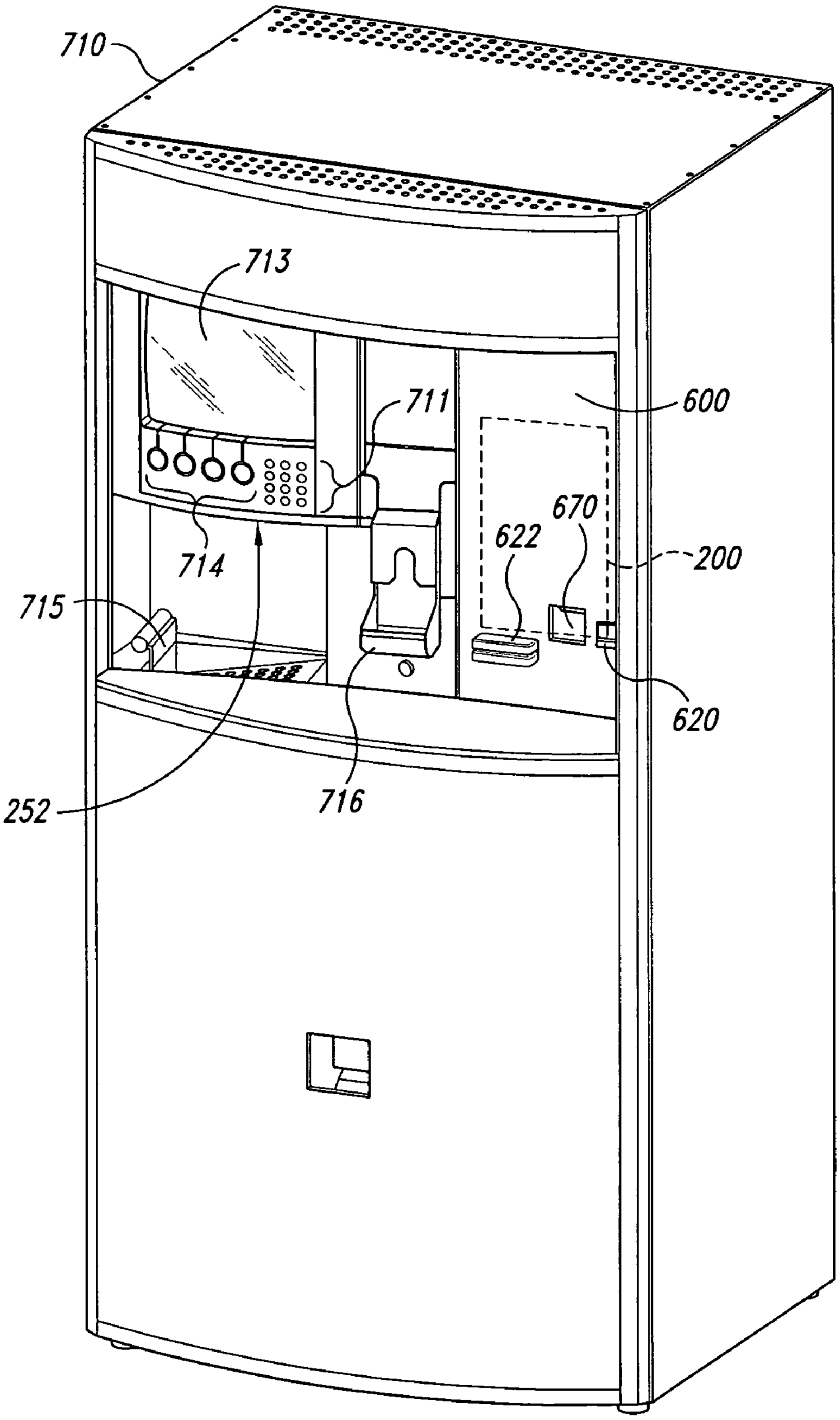
FIG. 7 is a front isometric view of a card vending structure that includes the drawer assembly of FIGS. 6A and 6B.

FIG. 7 is a front isometric view of a kiosk 710 that includes the drawer assembly 600 of FIG. 6 in accordance with an embodiment of the invention. In one aspect of this embodiment, the kiosk 710 can include features at least generally similar in structure and function to features of the coin-counting machines described in U.S. Pat. No. 6,494,776 to Molbak ("Molbak"), which is incorporated herein in its entirety by reference. In other embodiments, however, various aspects of the kiosk 710 can differ from the coin-counting machines described in Molbak, depending on the particular application.

In another aspect of this embodiment, the kiosk 710 includes a display screen 713 positioned proximate to the user interface 252. The user interface 252 includes user selection buttons 714 and a keypad 711. The display screen 713 can display various user instructions and prompts explaining how to purchase cards and/or perform other functions with the kiosk 710. The user selection buttons 714 can include, for example, various options for responding to the prompts and selecting a desired type of card or a desired method of payment. Similarly, the keypad 711 can allow the user to input various alphanumeric information, such as account numbers and/or monetary values, related to the card purchase transaction.

In a further aspect of this embodiment, the kiosk 710 also includes a coin input region or tray 715 configured to receive a plurality of coins from a user for counting. In one embodiment, the user can elect to receive a redeemable voucher via an outlet 716 for a value related to the total amount of coins counted. In another embodiment, the user can elect to pay for a card (such as a prepaid credit card or phone card) with coins as an alternative to paying for the card with a credit card via the card reader 622 or with paper currency via the bill acceptor 620.

In another aspect of this embodiment, a user desiring to purchase a card from the kiosk 710 may do so by first reading the card purchase instructions and prompts displayed on the display screen 713. (Alternatively, the instructions can be provided on the front or side of the kiosk 710 along with product advertising and/or other graphics.) By using the selection buttons 714 and/or the keypad 711 to respond to the prompts, the user can select a particular type of card (e.g., a credit card, debit card, phone card, etc.) and a particular card value. In one embodiment, the available card values (e.g., the amount of money or long-distance minutes associated with a card) may be predefined such that the user must choose from a limited number of options. In other embodiments, the value may be variable such that the user may be able to specify a card value. In either embodiment, the user then enters payment (e.g., via the coin input tray 715, the card reader 622, and/or the bill acceptor 620) sufficient to cover the cost of the selected card. Once the kiosk 710 confirms receipt of payment, the card dispensing apparatus 200 dispenses the desired card of the desired value to the user via the card outlet 670.

As mentioned above, in one embodiment, the kiosk 710 can be networked via the central computer 250 (FIG. 2) to other card vending machines and/or remote computer systems to exchange information related to card purchases. Such information can include, for example, bank account and credit/debit card account information, in addition to long-distance calling card account information. In another embodiment, the kiosk 710 can be networked to one or more remote computer systems and configured to transmit an appropriate signal when the machine is out of one or more types of cards. Service personnel with access to the remote computer system can then respond to the signal by restocking the machine with the needed cards. Similar signals can be transmitted from the kiosk 710 to the remote computer when the machine is malfunctioning, jammed, full of coins or other currency, and/or subject to theft, vandalism, or another form of tampering.

Figure 8:
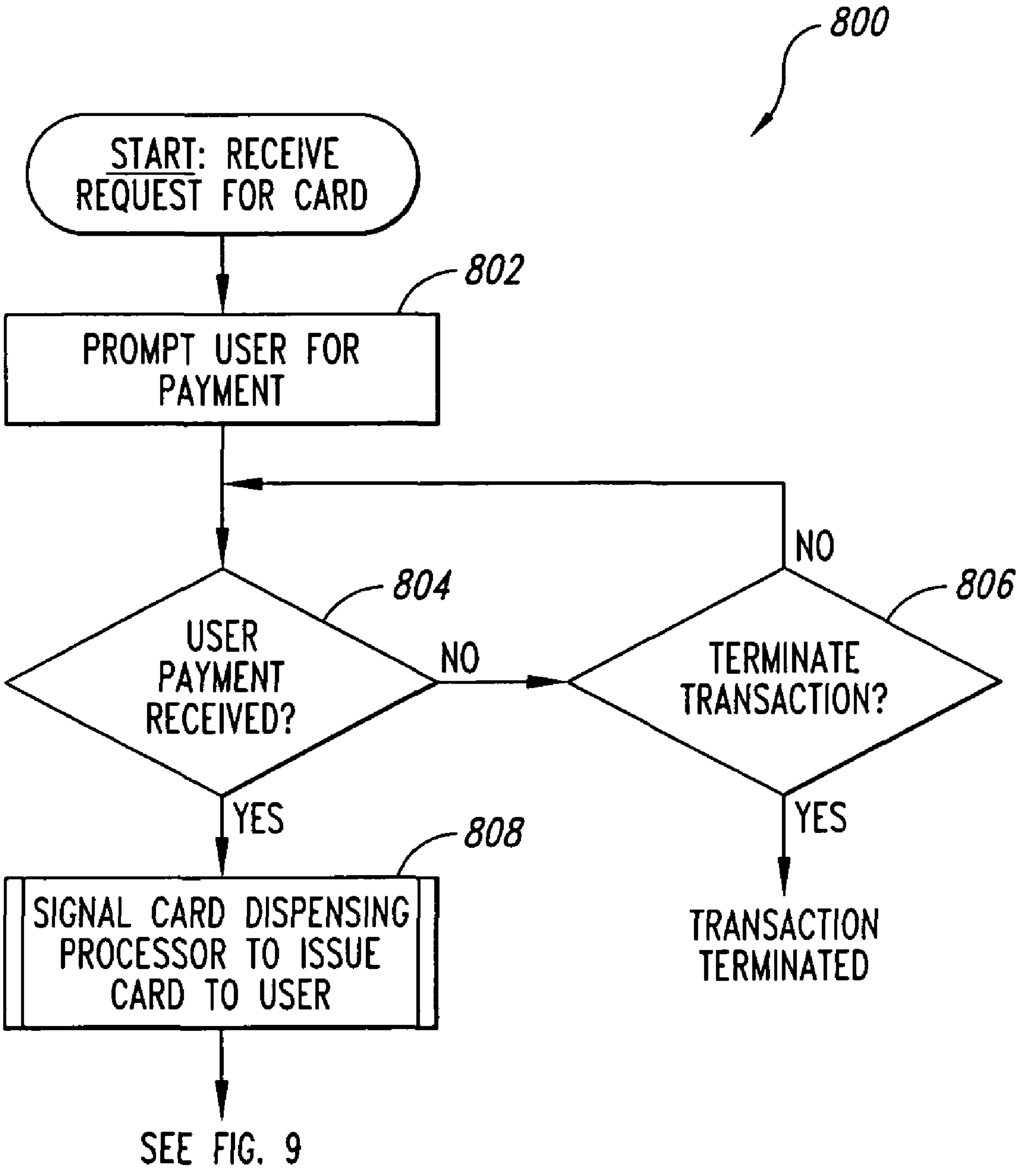
FIG. 8 is a flow diagram illustrating a routine for dispensing a card from a kiosk or other enclosure in accordance with an embodiment of the invention.

FIG. 8 is a flow diagram illustrating a routine 800 for dispensing a selected card to a user with the card dispensing apparatus 200 of FIG. 2, in accordance with an embodiment of the invention. In one aspect of this embodiment, the routine 800 can be carried out by the central computer 250 (FIG. 2) according to computer-executable instructions stored on a computer-readable medium, such as a floppy disk, CD-ROM, integrated circuit chip, etc. The routine 800 starts when the central computer 250 receives a request for a particular type of card. This request may come from the user interface 252 which, as described above, can include a keypad, touch screen, and/or other user selection buttons. In response to the card request, in block 802, the routine 800 prompts the user for payment for the card. Such payment can include cash received in the form of coins or bills, credit received in the form of a credit card account number, and/or debit in the form of a debit card account number. In other embodiments, cards can be purchased using other forms of payment, including voucher and/or prepayment from a remote computer via a computer network or an associated web site.

In decision block 804, the routine 800 determines if payment for the card has been received from the user or otherwise confirmed. If payment has not been received, then in decision block 806 the routine 800 determines if the transaction should be terminated. In one embodiment, the routine 800 can elect to terminate the transaction based on the amount of time that has elapsed without receiving payment from the user. In other embodiments, termination can be based on other factors, such as user termination input or lack of a user response to an appropriate prompt. If, however, the routine 800 determines that the transaction should not be terminated, then the routine 800 continues to wait for user payment and/or it can reprompt the user for payment. Once the routine 800 confirms that payment has been received, the routine proceeds to block 808 and signals the card dispensing processor 251 to issue the selected card to the user.

Figure 9:
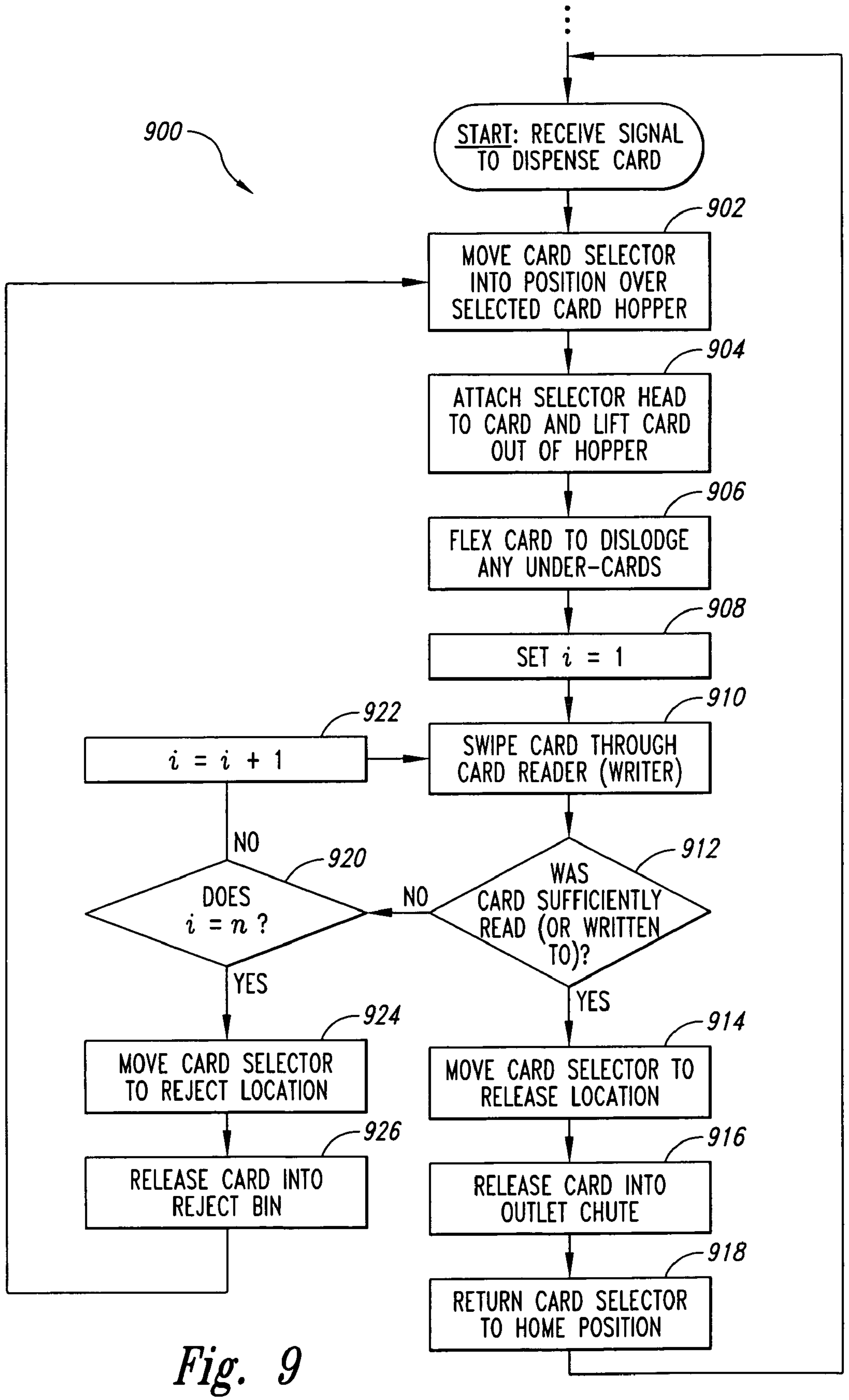
FIG. 9 is a flow diagram illustrating a routine for dispensing a card from a kiosk or other enclosure in accordance with another embodiment of the invention.

FIG. 9 is a flow diagram illustrating a routine 900 for dispensing a selected card to a user with the card dispensing apparatus 200 of FIG. 2, in accordance with another embodiment of the invention. In one aspect of this embodiment, the routine 900 can be carried out by the card dispensing processor 251 (FIG. 2) when it receives an instruction from the central computer 250 to dispense a particular card to the user. In block 902, the routine 900 responds (via the controller 240) by moving the card carrier 214 into position over the appropriate card hopper 232. In block 904, the routine 900 attaches the desired card to the selector head 212 (using, e.g., suction) and lifts the card out of the hopper 232 with the card carrier 214. In block 906, the routine 900 flexes the card with the selector head 212 to cause any under-cards to fall away.

In block 908, the routine 900 sets a counter $i=1$. Next, in block 910, the routine 900 moves the card carrier 214 past the card reader 290 (or card reader/writer 290) to swipe the selected card through the reader. In decision block 912, the routine 900 determines if the card was sufficiently read (or written to) by the card reader 290. If so, then the routine 900 proceeds to block 914 and moves the card carrier 214 to the release location 270 (FIGS. 2 and 6B). In block 916, the routine 900 releases the card into the outlet chute 674. In block 918, the routine 900 returns the card carrier 214 to the home position, and awaits another signal to dispense a card.

Returning to decision block 912, if the card was not sufficiently read (or written to) by the card reader 290, then the routine 900 proceeds to decision block 920 and determines if $i=\eta$. Here, $\eta$ can be a preselected number of times that a given card will be swiped through the card reader 290 before being rejected. In one embodiment, for example, $\eta$ can be three. In other embodiments, $\eta$ can have other values (e.g., 2, 4, 6, 10, etc.) depending on other factors. If i does not equal $\eta$ at decision block 920, then the routine 900 proceeds to block 922 and increments i by one. Next, the routine 900 returns to block 910 and repeats. If i does equal $\eta$ at decision block 920, then the routine 900 proceeds to block 924 and moves the card carrier 214 to the card reject location. In block 926, the routine 900 releases the unread card into the reject bin 672. From here, the routine 900 returns to block 902 and repeats until the desired card has been dropped into the outlet chute.

The foregoing description of embodiments of the invention is not intended to be exhaustive or to limit the invention to the precise embodiments disclosed. While specific embodiments of, and examples for, the invention are described herein for illustrative purposes, various equivalent modifications are possible within the scope of the invention, as those of ordinary skill in the relevant art will recognize. For example, although certain functions may be described in the present disclosure in a particular order, in alternate embodiments these functions can be performed in a different order or substantially concurrently, without departing from the spirit or scope of the present disclosure. In addition, the teachings of the present disclosure can be applied to other systems, not only the representative card vending systems described herein. Further, various aspects of the invention described herein can be combined to provide yet other embodiments.

All of the references cited herein are incorporated in their entireties by reference. Accordingly, aspects of the invention can be modified, if necessary or desirable, to employ the systems, functions, and concepts of the cited references to provide yet further embodiments of the invention. These and other changes can be made to the invention in light of the above-detailed description. In general, the terms used in the following claims should not be construed to limit the invention to the specific embodiments disclosed in the specification, unless the above-detailed description explicitly defines such terms. Accordingly, the actual scope of the invention encompasses the disclosed embodiments and all equivalent ways of practicing or implementing the invention under the claims.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

While certain aspects of the invention are presented below in certain claim forms, the inventors contemplate the various aspects of the invention in any number of claim forms. Accordingly, the inventors reserve the right to add claims after filing the application to pursue such additional claim forms for other aspects of the invention. Accordingly, the scope of the present invention is not limited, except by the appended claims.

We claim:

1. An apparatus for dispensing wallet-sized cards from a kiosk, the apparatus comprising:

a first hopper portion configured to hold a first stack of cards, the first stack of cards including at least a first card positioned on a second card;

at least a second hopper portion spaced apart from the first hopper portion in a first horizontal direction, wherein the second hopper portion is configured to hold a second stack of cards, the second stack of cards including at least a third card positioned on a fourth card; and a card transport assembly positioned relative to the first and second hopper portions, wherein the card transport assembly includes:

a first elongate support member positioned above the first and second hopper portions and aligned with the first horizontal direction;

a second elongate support member positioned above the first and second hopper portions and aligned with a second horizontal direction perpendicular to the first horizontal direction; and a selector head moveably coupled to the first and second elongate support members, wherein the selector head is configured to lift the first card in an upwardly direction off the second card, move the first card in the second horizontal direction away from the first hopper portion, and release the first card in a downwardly direction toward a card outlet, wherein the first support member facilitates movement of the selector head in the first horizontal direction away from the first hopper portion toward the second hopper portion, and wherein the second support member facilitates movement of the selector head in the second horizontal direction away from the first hopper portion toward the card outlet.

2. An apparatus for dispensing wallet-sized cards from a kiosk, the apparatus comprising:

at least a first hopper portion configured to hold a first stack of cards, the first stack of cards including at least a first card positioned on a second card;

a second hopper portion positioned proximate to the first hopper portion, wherein the second hopper portion is configured to hold a second stack of cards, the second stack of cards including at least a third card positioned on a fourth card;

a card transport assembly positioned relative to the first hopper portion, wherein the card transport assembly is configured to lift the first card in an upwardly direction off the second card, move the first card away from the first hopper portion, and release the first card toward a card outlet; and wherein the card transport assembly is further configured to lift the third card off the fourth card, move the third card away from the second hopper portion, and release the third card toward the card outlet;

a chassis that positions the card transport assembly relative to the first and second hopper portions; and a card reader fixedly attached to the chassis and stationary relative to the first and second hopper portions, wherein the card reader is configured to read information off the first card as the card transport assembly moves the first card past the card reader.

3. The apparatus of claim 2 wherein the card transport assembly includes at least one suction cup for releasably attaching the first card to the card transport assembly.

4. The apparatus of claim 2 wherein the card transport assembly includes:

at least one suction cup; and a pump operably connected to the suction cup, wherein the pump at least partially evacuates the suction cup to releasably attach the first card to the card transport assembly.

5. The apparatus of claim 2 wherein the card transport assembly includes at least one suction cup for releasably attaching the first card to the card transport assembly, and wherein the card dispensing apparatus further comprises a card reader configured to read information off the first card as the suction cup carries the first card past the card reader.

6. A card dispensing apparatus comprising:

at least a first card hopper configured to hold a first stack of cards, the first stack of cards including at least a first card positioned on top of a second card;

a second card hopper configured to hold a second stack of cards, the second stack of cards including at least a third card positioned on a fourth card; and a card carrier moveable between a first position proximate to the first card hopper and a second position spaced apart from the first card hopper, wherein the card carrier includes a selector head configured to secure the first card to the card carrier when the card carrier is in the first position, wherein the selector head is further configured to release the first card from the card carrier when the card carrier is in the second position, wherein the selector head is configured to secure the third card to the card carrier when the card carrier is in a third position proximate to the second card hopper, and wherein the selector head is further configured to release the third card from the card carrier when the card carrier is in the second position.

7. The card dispensing apparatus of claim 6 wherein the selector head is configured to drop the first card into a card outlet when the card lifter is in the second position.

8. The card dispensing apparatus of claim 6, further comprising a card reader configured to read information off the first card as the card carrier moves the first card past the card reader.

9. The card dispensing apparatus of claim 6, further comprising a card reader configured to read information off a magnetic stripe on the first card as the card carrier moves the first card past the card reader.

10. The card dispensing apparatus of claim 6, further comprising a card writer configured to write information to the first card as the card carrier moves the first card past the card writer.

11. The card dispensing apparatus of claim 6 wherein the selector head includes at least one suction cup, wherein the suction cup releasably secures the first card to the card carrier when the card carrier is in the first position, and wherein the suction cup releases the first card from the card carrier when the card carrier is in the second position.

12. The card dispensing apparatus of claim 6 wherein the card carrier further includes:

an elongate rack operably coupled to the selector head; and a pinion gear operably engaged with the elongate rack, wherein rotation of the pinion gear in a first direction drives the selector head downwardly, and wherein rotation of the pinion gear in a second direction opposite to the first direction drives the selector head upwardly.

13. The card dispensing apparatus of claim 6, further comprising at least one lead screw operably coupled to the card carrier, wherein rotation of the lead screw in a first direction moves the card carrier from the first position toward the second position, and wherein rotation of the lead screw in a second direction opposite to the first direction moves the card carrier from the second position toward the first direction.

14. A card dispensing apparatus comprising:

at least a first card hopper configured to hold a first stack of cards, the first stack of cards including at least a first card positioned on a second card; and a card carrier moveable between a first position proximate to the first card hopper and a second position spaced apart from the first card hopper, wherein the card carrier includes:

a selector head configured to secure the first card to the card carrier when the card carrier is in the first position, wherein the selector head is further configured to release the first card from the card carrier when the card carrier is in the second position, and wherein the selector head includes at least one suction cup;

an elongate rack operably coupled to the suction cup; and a pinion gear operably engaged with the elongate rack, wherein rotation of the pinion gear in a first direction drives the suction cup downwardly and against the first card when the card carrier is in the first position, and wherein rotation of the pinion gear in a second direction opposite to the first direction drives the suction cup upwardly and away from the first card hopper when the card carrier is in the first position.

15. A kiosk for dispensing cards to customers, the kiosk comprising:

an enclosure having a card outlet;

a user interface mounted to the enclosure, wherein the user interface is configured to receive a card selection from a customer;

a monetary input region mounted to the enclosure, wherein the monetary input region is configured to receive a form of payment from the customer for the card selection;

a first hopper portion positioned within the enclosure and configured to hold a first stack of cards, the first stack of cards including at least a first card positioned on a second card;

at least a second hopper portion positioned within the enclosure and spaced apart from the first hopper portion in a first horizontal direction, wherein the second hopper portion is configured to hold a second stack of cards, the second stack of cards including at least a third card positioned on a fourth card; and a card transport assembly positioned within the enclosure, wherein the card transport assembly includes:

a first elongate support member positioned above the first and second hopper portions and aligned with the first horizontal direction;

a second elongate support member positioned above the first and second hopper portions and aligned with a second horizontal direction perpendicular to the first horizontal direction; and a selector head moveably coupled to the first and second elongate support members, wherein the first support member facilitates movement of the selector head in the first horizontal direction and the second support member facilitates movement of the selector head in the second horizontal direction, wherein the selector head is configured to lift the first card in an upwardly direction off of the second card and transfer the first card to the card outlet when the customer card selection corresponds to the first card, and wherein the selector head is further configured to lift the third card in an upwardly direction off of the fourth card and transfer the third card to the card outlet when the customer card selection corresponds to the third card.

16. The kiosk of claim 15 wherein the monetary input region includes a coin-input portion configured to receive a plurality of randomly oriented coins from a user for at least partial payment for a selected card.

17. The kiosk of claim 15, further comprising a card reader positioned within the enclosure, wherein the card reader is configured to read information off at least the first card as the card transport assembly transfers the first card toward the card outlet.

18. The kiosk of claim 15, further comprising:

a card reader positioned within the enclosure, wherein the card reader is configured to read information off at least the first card as the card transport assembly transfers the first card toward the card outlet; and a reject bin positioned within the enclosure, wherein the card transport assembly is further configured to transfer the first card to the reject bin instead of the card outlet if the card reader does not sufficiently read the information off the first card.

19. The kiosk of claim 18 wherein the reject bin is at least generally inaccessible to the user of the kiosk.

20. The kiosk of claim 15, further comprising a card writer positioned within the enclosure, wherein the card writer is configured to write information to at least the first card as the card transport assembly transfers the first card toward the card outlet.

21. A system for dispensing cards, the system comprising:

first means for holding a first plurality of cards at a first location, the first plurality of cards including a first card stacked on top of a second card;

second means for holding a second plurality of cards at a second location different than the first location, the second plurality of cards including a third card stacked on top of a fourth card;

means for lifting the first card off of the second card and transferring the first card toward a first card outlet in response to a first user selection, and for lifting the third card off of the fourth card and transferring the third card toward a second card outlet in response to receiving a second user selection; and means for reading information off at least the first card as the first card is being transferred toward the first card outlet, wherein the means for reading is separate from the means for lifting and stationary relative to the first and second means for holding.

22. The system of claim 21 wherein the first card outlet and the second card outlet are the same outlet.

23. The system of claim 21, wherein the means for reading information include means for moving the first card past a card reader multiple times.

24. The system of claim 21, further comprising means for flexing the first card to break any adhesion that may exist between the first card and the second card and release the second card from the first card.

25. A method for dispensing at least first and second card types from an enclosure, the method comprising:

placing a first plurality of cards at a first location within the enclosure, wherein the first plurality of cards includes at least a first card of the first type positioned on top of a second card of the first type;

placing a second plurality of cards at a second location within the enclosure, wherein the second plurality of cards includes at least a third card of the second type positioned on top of a fourth card of the second type;

in response to receiving a first request for a card of the first type:

positioning a card carrier proximate to the first location;

lifting the first card off of the second card with the card carrier; and transferring the first card to the card outlet with the card carrier;

in response to receiving a second request for a card of the second type:

positioning the card carrier proximate to the second location;

lifting the third card off of the fourth card with the card carrier; and transferring the third card to the card outlet with the card carrier.

26. The method of claim 25, further comprising, in response to receiving a first request for a card of the first type, moving the first card past a card reader after lifting the first card off of the second card.

27. The method of claim 25, further comprising, in response to receiving a first request for a card of the first type:

moving the first card past a card reader a first time after lifting the first card off of the second card;

determining if the card reader sufficiently read information off the first card as the first card moved past the card reader the first time; and when the card reader did not sufficiently read the information off the first card, moving the first card past the card reader at least a second time.

28. The method of claim 25, further comprising, in response to receiving a first request for a card of the first type:

moving the first card past a card reader a first time after lifting the first card off of the second card;

determining if the card reader sufficiently read information off the first card as the first card moved past the card reader the first time;

when the card reader did not sufficiently read the information off the first card, moving the first card past the card reader at least a second time;

determining if the card reader sufficiently read information off the first card as the first card moved past the card reader the at least a second time; and when the card reader did not sufficiently read the information off the first card the at least a second time, transferring the first card to a reject bin.

29. The method of claim 25 wherein the first type of card is a first type of value card and the second type of card is a second type of value card.

30. The method of claim 25 wherein the first type of card is a type of card having a first value, and the second type of card is a type of card having a second value, different than the first value.

31. The method of claim 25 wherein the first type of card is a type of value card, and the second type of card is a type of debit card.

32. The method of claim 25 wherein the first type of card is a type of card for making purchases in a first retail establishment, and the second type of card is a type of card for making purchases in a second retail establishment.

33. The method of claim 25 wherein lifting the first card off of the second card includes flexing the first card to break any adhesion that may exist between the first card and the second card to release the second card from the first card.

34. An apparatus for dispensing cards, the apparatus comprising:

a first card hopper configured to hold a first vertical stack of cards, the first vertical stack of cards including at least a first card positioned on top of a second card;

a second card hopper offset from the first card hopper in a first direction, wherein the second card hopper is configured to hold a second vertical stack of cards, the second vertical stack of cards including at least a third card positioned on top of a fourth card;

at least a third card hopper offset from the first card hopper in a second direction perpendicular to the first direction, wherein the third card hopper is configured to hold a third vertical stack of cards, the third vertical stack of cards including at least a fifth card positioned on top of a sixth card; and a card carrier selectively moveable in the first and second directions between a first position proximate the first card hopper, a second position proximate the second card hopper, and a third position proximate the third card hopper, wherein the card carrier includes a selector head configured to:

lift the first card in an upwardly direction off the second card when the card carrier is in the first position, lift the third card in an upwardly direction off the fourth card when the card carrier is in the second position, and lift the fifth card in an upwardly direction off the sixth card when the card carrier is in the third position.

35. The apparatus of claim 34 wherein the selector head is further configured to release the first, third, and fifth cards from the card carrier when the card carrier is in a fourth position offset from the first, second, and third positions.

* * * * *

UNITED STATES PATENT AND TRADEMARK OFFICE

CERTIFICATE OF CORRECTION

PATENT NO. : 7,748,619 B2

APPLICATION NO. : 11/294652
DATED : July 6, 2010
INVENTOR(S) : Douglas A. Martin et al.

It is certified that error appears in the above-identified patent and that said Letters Patent is hereby corrected as shown below:

In column 15, line 18, in claim 23, delete "claim 21," and insert -- claim 21 --, therefor.

Signed and Sealed this

Seventh Day of September, 2010

David J. Kappos

David J. Kappos
*Director of the United States Patent and Trademark Office*